US006562880B1

(12) United States Patent
Doerge et al.

(10) Patent No.: US 6,562,880 B1
(45) Date of Patent: May 13, 2003

(54) POLYURETHANE OR POLYISOCYANURATE FOAMS BLOWN WITH HYDROFLUOROCARBONS AND CARBON ATOMS

(75) Inventors: Herman P. Doerge, St. Petersburgh, FL (US); Mauricio H. Venegas, Macomb, MI (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/124,567

(22) Filed: Apr. 17, 2002

(51) Int. Cl.[7] ................................................. C08J 9/04
(52) U.S. Cl. .................. 521/130; 521/131; 521/167; 521/170; 521/174
(58) Field of Search ................................ 521/130, 131, 521/167, 170, 174

(56) References Cited

U.S. PATENT DOCUMENTS

| | | |
|---|---|---|
| 2,697,118 A | 12/1954 | Lundsted et al. |
| 3,085,085 A | 4/1963 | Wismer et al. |
| 3,153,002 A | 10/1964 | Wismer et al. |
| 3,215,652 A | 11/1965 | Kaplan |
| 3,222,357 A | 12/1965 | Wismer et al. |
| 4,900,365 A | 2/1990 | Lund et al. ................... 134/12 |
| 4,931,482 A | 6/1990 | Lamberts et al. ............ 521/131 |
| 4,972,002 A | 11/1990 | Volkert ....................... 521/120 |
| 5,164,418 A | 11/1992 | Behme et al. ............... 521/131 |
| 5,164,419 A | 11/1992 | Bartlett et al. .............. 521/131 |
| 5,169,873 A | 12/1992 | Behme et al. ............... 521/114 |
| 5,461,084 A | 10/1995 | Doerge ....................... 521/167 |
| 5,801,210 A * | 9/1998 | Radovich et al. ............. 264/50 |
| 5,834,527 A * | 11/1998 | Sulzbach ...................... 264/41 |
| 5,962,749 A | 10/1999 | Parsons et al. .............. 568/621 |
| 6,004,482 A | 12/1999 | Adkins et al. .......... 252/400.62 |
| 6,013,691 A * | 1/2000 | Braun et al. ................ 222/635 |
| 6,100,309 A * | 8/2000 | Illger et al. ................. 521/133 |

OTHER PUBLICATIONS

Polyurethanes World Congress 1987, Sep. 29–Oct. 2, 1987, p. 59–66, K.T. Dishart & J.A. Creazzo, "The DuPont Program on Fluorocarbon Alternative Blowing Agents for Polyurethane Foams".

* cited by examiner

Primary Examiner—John M. Cooney, Jr.
(74) Attorney, Agent, or Firm—Joseph C. Gil; Noland J. Cheung; John E. Mrozinski, Jr.

(57) ABSTRACT

Rigid polyurethane or polyisocyanurate foams are produced by reacting an organic polyisocyanate with an amine-based polyether polyol in the presence of a catalyst, a hydrogen-containing fluorocarbon, water and carbon dioxide.

14 Claims, No Drawings

POLYURETHANE OR POLYISOCYANURATE FOAMS BLOWN WITH HYDROFLUOROCARBONS AND CARBON ATOMS

FIELD OF THE INVENTION

The present invention relates to a process for the production of rigid polyurethane or polyisocyanurate foams in which an HFC (hydrogen-containing fluorocarbon) is used in combination with an added amount of carbon dioxide.

BACKGROUND OF THE INVENTION

Processes for the production of rigid polyurethane foams are known. See, for example, U.S. Pat. Nos. 3,085,085; 3,153,002; 3,222,357; and 4,430,490.

At the present time, a major concern of foam producers, particularly rigid foam producers, is the development of rigid foam systems in which the ozone depleting chlorofluorocarbon ("CFC") or hydrochlorofluorocarbon ("HCFC") blowing agent is replaced with a more environmentally acceptable blowing agent. HFCs (hydrogen containing fluorocarbons), and hydrocarbons such as n-pentane, cyclopentane, isopentane and blends of these blowing agents are presently considered to be possible alternatives.

U.S. Pat. No. 4,900,365, for example, teaches that a mixture of trichlorofluoromethane, a dichlorofluoroethane selected from a specified group and isopentane is useful as a blowing agent for the preparation of polyurethane foams. Dishart et al's paper entitled "The DuPont Program on Fluorocarbon Alternative Blowing Agents for Polyurethane Foams", *Polyurethanes World Congress* 1987, pages 59–66 discusses the investigation of various HCFCs as possible blowing agents for rigid polyurethane foams. Neither of these disclosures, however, teaches a process for the production of rigid polyurethane foams having good physical properties from polyols with an HFC blowing agent.

U.S. Pat. No. 4,972,002 discloses a process for the production of cellular plastics in which an emulsion is used. A low boiling fluorinated or perfluorinated hydrocarbon or sulfur hexafluoride is emulsified in one of the starting materials (i.e., the isocyanate, polyol, etc.) from which the foam is to be produced U.S. Pat. No. 5,169,873 discloses a process for the production of foams in which the blowing agent is a mixture of at least one fluoroalkane corresponding to a specified formula and at least one fluorinated ether corresponding to a specified formula.

U.S. Pat. No. 5,164,419 discloses a process for the production of polyurethane foams in which 1,1-difluoroethane in combination with a minimum amount of water is used as the blowing agent. However, the only foam described in this disclosure had a high k-factor of 0.18 BTU-in/hr-ft$^2$-° F.

U.S. Pat. No. 5,164,418 discloses a process for producing isocyanate-based foams in which the blowing agent is at least 10 mol % of a fluoroalkane. Mixtures of a fluoroalkane and significant amounts of water (i.e., greater than 20%) are exemplified.

U.S. Pat. No. 4,931,482 discloses the use of 1,1,1,4,4,4-hexafluorobutane as a blowing agent to produce isocyanate-based foams such as polyurethane and polyisocyanurate foams. The disclosed foams are made by reacting an isocyanate with any of the known isocyanate-reactive compounds. Water and other known blowing agents may optionally be used in combination with the required 1,1,1,4,4,4-hexafluorobutane blowing agent. The k-factors for foams produced using the hexafluorobutane blowing agent are not, however, reported.

Even though the use of HFC's may offer the best solution to the appliance industry as an alternative to the use of HCFC's, the costs of such HFC's are expected to be higher than the use of HCFC's. Therefore, means of reducing the levels of HFC's are desired. One way of reducing levels of HFC's is to use water to generate carbon dioxide as a blowing agent in the foam formulation.

U.S. Pat. No. 5,461,084 discloses a process for the production of rigid polyurethane foams produced by reacting an amine, an organic polyisocyanate, an HFC, and also an amount of water.

However, this is undesirable in an industry where the use of increased amounts of water will likely increase the thermal conductivity.

Therefore, a process in which a polyol and water could be used in combination with the more environmentally acceptable HFC blowing agents to produce a rigid polyurethane foam having good physical properties, including low k-factor, would be advantageous.

SUMMARY OF THE INVENTION

It is an object of the present invention to provide a process for the production of rigid polyurethane foams in which an HFC in combination with an amount of water and also added carbon dioxide is used as the blowing agent.

It is a further object of the present invention to provide a process for the production of rigid polyurethane foams which are useful in the production of refrigeration units.

These and other objects which will be apparent to those skilled in the art are accomplished by reacting an organic polyisocyanate with an amine-initiated polyether polyol having an average molecular weight of at least about 149, preferably from about 149 to about 1500, in the presence of a hydrogen-containing fluorocarbon, a minor amount of water, carbon dioxide, surfactant and a catalyst. Isocyanate-reactive compounds which are not amine-initiated may optionally be included in the reaction mixture in an amount of up to 70% by weight, based on the total amount of isocyanate-reactive materials.

DETAILED DESCRIPTION OF THE PRESENT INVENTION

The present invention is directed to a process for the production of rigid polyurethane foams or polyisocyanurate foams and to the foams produced by this process. In the process of the present invention, (a) an organic isocyanate is reacted with (b) an amine-based polyether polyol having an average molecular weight of at least about 149, preferably from about 149 to about 1500, and an epoxide content of from about 65 to about 98% by weight, preferably from about 75 to about 98% by weight based on the total weight of the amine initiator plus the epoxide, in the presence of (c) a blowing agent made up of (1) at least one hydrogen-containing fluorocarbon and (2) an amount of water and (3) an added amount of carbon dioxide and (d) a catalyst, and (e) at least one surfactant, at an isocyanate index of from about 0.9 to about 3.0, preferably from about 1.00 to about 1.50. The product foams generally have k-factors ranging from about 0.120 BTU-in./hr.ft$^{2°}$ F. to 0.160 BTU-in./hr.ft$^{2°}$ F. at 75° F.

Any of the known organic isocyanates, modified isocyanates or isocyanate-terminated prepolymers made from any of the known organic isocyanates may be used in the practice of the present invention. Suitable isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydro-toluene diisocyanate and its isomers, isophorone diisocyanate, dicyclohexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylpolyisocyanates.

Undistilled or a crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanate include prepolymers containing NCO groups and having an NCO content of from about 25 to about 35 wt %, preferably from about 28 to about 32 wt %, particularly those based on polyether polyols or polyester polyols and diphenylmethane diisocyanate. Processes for the production of these prepolymers are known in the art.

The most preferred polyisocyanates for the production of rigid polyurethanes in accordance with the present invention are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 34% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 0.9 to about 3.0, preferably from about 1.0 to about 1.5.

The polyols employed in the process of the present invention are amine-initiated polyether polyols having functionalities of from about 3 to about 5 and molecular weights of at least about 149, preferably from about 149 to about 1500, most preferably from about 300 to about 800. These amine-based polyols are prepared by reacting an amine, polyamine or aminoalcohol and optionally other initiators (with or without water) with propylene oxide and optionally, ethylene oxide, and also optionally, in the presence of an alkaline catalyst. If an alkaline catalyst is utilized, the removal or neturalization of the catalyst can be by the treatment of the product with an acid, preferably a hydroxycarboxylic acid so as to neutralize the alkaline catalyst, extraction of the catalyst, or the use of ion exchange resins. Such processes are described in U.S. Pat. No. 5,962,749. U.S. Pat. Nos. 2,697,118 and 6,004,482 disclose a suitable process for the production of such amine-initiated polyols.

Examples of suitable amine initiators include: ammonia, ethylene diamine, diethylene triamine, hexamethylene diamine and aromatic amines such as toluene diamine, and aminoalcohols. The preferred initiator is toluene diamine.

It is preferred that the amine initiator be reacted with propylene oxide, or ethylene oxide, followed by propylene oxide. If used, the ethylene oxide may be used in an amount up to 60% by weight of the total alkylene oxide used. The propylene oxide is generally used in an amount of from about 40 to about 100% by weight of the total alkylene oxide employed, preferably from about 60 to about 100% by weight. The total amount of alkylene oxide used is selected so that the product polyol will have an average molecular weight of at least about 149, preferably from about 149 to about 1500.

The amine-based polyether polyol is included in the foam-forming mixture in an amount of from about 10 to 70% by weight, based on the total foam-forming mixture, preferably from about 15 to about 50% by weight.

Other polyether polyols (i.e., polyether polyols which are not based on an amine) known to be useful in the production of rigid polyurethane foams as well as polyester polyols may, optionally, be used in combination with the required amine-based polyether polyol. When used, these optional polyols are present in an amount which is no greater than 70%, preferably from about 20 to about 50% of the total amount of polyol.

The HFC blowing agent employed in the process of the present invention may be any of the known hydrogen-containing fluorocarbons having three to five carbons. Specific examples of such blowing agents include: 1,1,1,4,4,4-hexafluorobutane (HFC-356); the pentafluoropropanes such as 1,1,2,2,3-pentafluoropropane (HFC-245ca), 1,1,2,3,3-pentafluoropropane (HFC-245ea), 1,1,1,2,3-pentafluoropropane (HFC-245eb), and 1,1,1,3,3-pentafluoropropane (HFC-245fa); the hexafluoropropanes such as 1,1,2,2,3,3-hexafluoropropane (HFC-236ca), 1,1,1,2,2,3-hexafluoropropane (HFC-236cb), 1,1,1,2,3,3-hexafluoropropane (HFC-236ea), 1,1,1,3,3,3-hexafluoropropane (HFC-236fa); and the pentafluorobutanes such as 1,1,1,3,3-pentafluorobutane (HFC-365). HFC-245fa is preferred. The blowing agent is generally included in the foam-forming mixture in an amount of from about 3 to about 20% by weight, based on the total foam formulation, preferably from about 5 to about 16% by weight.

Water is also included in the reaction mixtures of the present invention. As used herein, water in an amount of up to about 5.0%, preferably from about 0.1% to about 3.0%, most preferably from about 0.2 to about 2.0%, based on the total foam formulation is included in the reaction mixture.

Carbon dioxide is also included in the reaction mixtures of the present invention. As used herein, carbon dioxide in an amount of up to about 5.0%, and preferably from about 0.5 to 2.5% based on the total foam formulation is included in the reaction mixture Any of the catalysts known to be useful in the production of rigid polyurethane foams may be employed in the process of the present invention. Tertiary amine catalysts are particularly preferred. Specific examples of suitable catalysts include: pentamethyldiethylenetriamine, N,N-dimethylcyclohexylamine, N,N',N"-dimethylaminopropylhexahydrotriazine, tetramethylethylenediamine, tetramethylbutylene diamine and dimethylethanolamine. Pentamethyldiethylenetriamine, N,N',N"-dimethylaminopropylhexahydrotriazine, and N,N-dimethylcyclohexylamine are particularly preferred.

Materials which may optionally be included in the foam-forming mixtures of the present invention include: chain extenders, crosslinking agents, surfactants, pigments, colorants, fillers, antioxidants, flame retardants, and stabilizers. Surfactants are a preferred additive.

The isocyanate and isocyanate-reactive materials are used in quantities such that the equivalent ratio of isocyanate groups to isocyanate-reactive groups is from about 0.9 to about 3.0, preferably from about 1.0 to about 1.5.

Having thus described our invention, the following examples are given as being illustrative thereof. All parts and percentages given in these examples are parts by weight and percentages by weight, unless otherwise indicated.

EXAMPLES

The materials used in the following examples were as follows:

POLYOL A: A polyether polyol prepared by alkoxylating a sucrose, propylene glycol and water starter having a hydroxyl number of from about 450 to 490 mg KOH/g which is commercially available from Bayer Corporation under the designation Multranol 9196.

POLYOL B: An aromatic amine-initiated polyether polyol having an OH number of from 378–398 and a functionality of 4 which is available from Bayer Corporation under the designation Multranol 8114.

POLYOL C: An aromatic polyester polyol blend having a hydroxyl number of about 240 mg KOH/g and a functionality of about 2.0 which is commercially available from Stepan Company under the designation Stepanpol PS 2502A.

POLYISOCYANATE A (NCO A): A modified polymeric Diphenylmethane diisocyanate prepolymer, CAS #184719-86-6, with an NCO content of about 30.2%.

CATALYST A (CAT. A): a tertiary amine catalyst which is commercially available from Air Products and Chemicals, Inc. under the name Polycat 8.

CATALYST B (CAT. B): A catalyst useful for the production of polyurethane foams which is commercially available from RheinChemie under the name Desmorapid PV.

SURFACTANT (Surf.): A silicone surfactant that is commercially available from Air Products and Chemicals, Inc. under the name DC-5357.

HFC-245fa: 1,1,1,3,3-pentafluoropropane that is commercially available from Honeywell International Inc.

Examples 1–6

Foams were prepared by reacting the components listed in Table 1 in the amounts indicated by mixing the polyols, catalysts, surfactant, water and blowing agents to form a master batch. The master batch was then mixed with the amount of polyisocyanate indicated in Table 1. All foams were prepared using a Hennecke HK-100 high pressure foam machine equipped with a Hennecke MQ 12-2 mixhead. The liquid output was maintained at a constant 60 lbs./min and the recycle and pour pressures were held at 1500 psig. The minimum fill density was determined from foam panels poured into a temperature controlled Bosch mold at 120° F. (49° C.) with an internal volume of 79 inches (200 cm) by 8 inches (20 cm) by 2 inches (5 cm). Panels were then prepared at four higher densities at 0.15, 0.20, 0.25, and 0.30 lb./ft$^3$ over the minimum fill density. The top half of each panel was cut into ten sections of 4 inches (10 cm) and subjected to –4° F. (–20° C.) for at least 16 hours. The panel with the lowest density, which exhibited no significant dimensional change, was considered to be freeze stable. Additional panels for foam properties were all prepared at this "freeze stable density". K-factors were measured on the center core section at 35° F. (2° C.) and 75° F. (24° C.) mean temperatures on a Lasercomp FOX 200 heat flow meter. The properties of those foams are also reported in Table 1.

TABLE 1

| Description | 1<br>Control 1 | 2<br>Example 1 | 3<br>Control 2 | 4<br>Example 2 | 5<br>Comp. Ctrl. B | 6<br>Comp. Ex. 3 |
|---|---|---|---|---|---|---|
| Polyol A, pbw | — | — | 33.01 | 33.01 | 36.70 | 36.70 |
| Polyol B, pbw | 78.64 | 78.64 | 33.01 | 33.01 | 16.68 | 16.68 |
| Polyol C, pbw | — | — | 7.34 | 7.34 | 13.34 | 13.34 |
| CAT. A, pbw | 0.94 | 0.94 | 1.35 | 1.35 | — | — |
| Surf., pbw | 2.80 | 2.80 | 2.54 | 2.54 | 2.42 | 2.42 |
| CAT B, pbw | 0.47 | 0.47 | 0.67 | 0.67 | 1.33 | 1.33 |
| Water, pbw | 2.60 | 2.60 | 1.70 | 1.70 | 0.80 | 0.80 |
| $CO_2$, pbw | — | 1.00 | — | 1.00 | — | 1.00 |
| HFC-245fa, pbw | 14.55 | 14.55 | 20.38 | 20.38 | 28.07 | 28.07 |
| Polyisocyanate A | 121.1 | 121.1 | 103.5 | 103.5 | 93.4 | 93.4 |
| Temp. Iso/Polyol ° F. | 75/60 | 75/60 | 80/70 | 80/70 | 75/60 | 75/60 |
| Minimum Fill Density (lb/ft$^3$) | 2.02 | 1.96 | 1.93 | 1.89 | 1.84 | 1.81 |
| Freeze Stable Density (lb/ft$^3$) | 2.34 | 2.17 | 2.17 | 2.09 | 2.09 | 2.05 |
| % Packing | 15.6 | 10.7 | 12.4 | 10.6 | 13.6 | 13.2 |
| Core Density (lb/ft$^3$) | 2.05 | 1.89 | 1.96 | 1.92 | 1.92 | 1.78 |
| k-factor, (35° F.)<br>BTU-in./hr.ft$^{2°}$ F.) | 0.127 | 0.126 | 0.134 | 0.133 | 0.118 | 0.121 |
| k-factor, (75° F.)<br>BTU-in./hr.ft$^{2°}$ F.) | 0.144 | 0.143 | 0.151 | 0.149 | 0.132 | 0.135 |

Surprisingly, in Examples 2 and 4, the addition of $CO_2$ to the formulation not only reduced the minimum fill density, but it also reduced the % overpack needed for the foam to be freeze stable at $-30°$ C. Furthermore, the addition of $CO_2$ actually reduced the k-factor of the foam compared to Examples 1 and 3, even though $CO_2$ itself has a relatively high k-factor.

In comparative examples 5 and 6, when the amount of amine initiated polyether was low (<10% of foam forming mixture) a density reduction was still achieved, but without the k-factor improvement observed in Examples 2 and 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of rigid polyurethane foams or polyisocyanurate foam comprising reacting:
    a) an organic diisocyanate and/or polyisocyanate with
    b) from about 10 to 70% by weight based on the weight of the total foam-forming mixture of an amine-initiated polyol having a molecular weight of at least 149 and a functionality of at least three in the presence of
    c) up to 5%, based on the total weight of the foam-forming reaction mixture of added carbon dioxide and water in an amount less than 5%, based on the total weight of the foam-forming reaction mixture, and
    d) up to 20%, based on the total weight of the foam-forming reaction mixture of a $C_3$ to $C_5$ fluorinated hydrocarbon.

2. The process of claim 1 in which the reaction mixture further includes one or more polyols having molecular weights of from about 92 to about 1500 which are not the same as amine-initiated polyol a).

3. The process of claim 1 in which the amine-initiated polyol has a molecular weight of from about 149 to about 1500.

4. The process of claim 1 in which the amine-initiated polyol a) is initiated with ethylene diamine, diethylenetriamine, hexamethylene diamine, an aromatic diamine, monoethanolamine, diethanolamine, triethanolamine or ammonia.

5. The process of claim 1 in which the HFC blowing agent is selected from the group consisting of hexafluorobutanes, hexafluoropropanes, pentafluoropropanes, pentafluorobutanes, and mixtures thereof.

6. The process of claim 5, wherein the HFC blowing agent is a pentafluoropropane.

7. The process of claim 6, wherein the HFC blowing agent is 1,1,1,3,3-pentafluoropropane.

8. The process of claim 1 in which the HFC d) is included in an amount of from about 3 to about 20%, based on the total weight of the foam-forming composition.

9. The process of claim 1 in which the equivalent ratio of isocyanate groups of a) to active-hydrogen groups of b) is from about 0.9 to about 3.0.

10. The process of claim 1 in which isocyanate a) is selected from the group consisting of polymeric MDI and isocyanate-terminated prepolymers prepared therefrom.

11. The process of claim 1 in which the amine-initiated polyol b) has a molecular weight of from about 300 to about 800.

12. The process of claim 1, wherein water in an amount less than 3%, based on the total weight of the foam-forming reaction mixture, is used.

13. The product of the process of claim 1.

14. The process of claim 4, wherein said aromatic diamine is a toluene diamine.

* * * * *